US007762565B2

(12) United States Patent
Hatamian et al.

(10) Patent No.: US 7,762,565 B2
(45) Date of Patent: Jul. 27, 2010

(54) MULTI-COMPONENT CONTAINER SYSTEM AND METHOD FOR MANUFACTURING THE SAME

(76) Inventors: Mehdi Hatamian, C/O Smart Medical Technologies, 15210 Desman Rd., La Mirada, CA (US) 90638; Mehrtosh Ghalebi, C/O M and T Industries, 15210 Desman Rd., La Mirada, CA (US) 90638

( * ) Notice: Subject to any disclaimer, the term of this patent is extended or adjusted under 35 U.S.C. 154(b) by 121 days.

(21) Appl. No.: 11/708,404

(22) Filed: Feb. 20, 2007

(65) Prior Publication Data

US 2008/0197645 A1 Aug. 21, 2008

(51) Int. Cl.
*B62B 1/00* (2006.01)

(52) U.S. Cl. ...................... 280/79.5; 220/908; 220/759; 220/484

(58) Field of Classification Search ............. 280/47.34, 280/79.5, 79.2, 47.35; 220/408, 908, 495.11, 220/610, 263, 252, 826, 819, 484, 643, 759; 264/122, 109, 241; 62/457.5, 371, 457.2, 62/530
See application file for complete search history.

(56) References Cited

U.S. PATENT DOCUMENTS 3,643,993 A * 2/1972 Asadurian ................... 220/908
3,734,340 A * 5/1973 Ippolito et al. ......... 220/495.11
4,081,105 A * 3/1978 Dagonnet et al. ........... 220/263
4,167,271 A * 9/1979 Jorgensen .................. 280/79.5
4,838,418 A * 6/1989 Teixeira ..................... 206/386
4,883,189 A * 11/1989 Lobbert ...................... 220/908
4,913,301 A * 4/1990 Pickler ....................... 220/252
4,955,501 A * 9/1990 Hodge ........................ 220/908
5,105,967 A * 4/1992 Horpestad ................... 220/908
5,183,175 A * 2/1993 Brown ........................ 220/908
5,183,180 A * 2/1993 Hawkins et al. ............. 220/669
5,295,606 A * 3/1994 Karwoski ................... 220/908
5,330,071 A * 7/1994 Parker ........................ 220/908
5,356,031 A * 10/1994 Jondelius .................... 220/610
5,358,138 A * 10/1994 Karwoski .............. 220/495.11
5,772,063 A * 6/1998 Gantz-Bloome ............ 220/908
5,984,134 A * 11/1999 Mario ........................ 220/908
6,203,034 B1 * 3/2001 Houry ...................... 280/47.34
6,322,737 B1 * 11/2001 Beyer ......................... 264/122
6,497,423 B1 * 12/2002 Perelli et al. ............. 280/47.34
6,554,012 B2 * 4/2003 Patarra ...................... 62/457.7
6,632,064 B1 * 10/2003 Walker et al. ............... 220/908
6,675,606 B1 * 1/2004 Jones et al. ................ 62/457.7
6,799,434 B1 * 10/2004 Hobbs, Jr. .................. 62/457.9
6,851,276 B2 * 2/2005 Perrins ...................... 62/457.5

(Continued)

*Primary Examiner*—Hau V Phan
(74) *Attorney, Agent, or Firm*—Stetina Brunda Garred & Brucker

(57) ABSTRACT

An improved multi-modular waste container formed at least in part from molded structural-foam. Per conventional waste containers, the improved waste container includes a housing for receiving trash, which will preferably be disposed upon one or more casters. One or more lids are hingeingly engaged to the top perimeter of the housing to provided selective access to the trash receptacle. Detachably fastenable slots may be affixed to opposed sides of the housing to facilitate engagement with and emptying by front-loading garbage trucks. The improved waste containers are substantially lighter, easier to maintain, stronger, chemical and corrosion resistant and possess substantially greater sound deadening characteristics than prior art waste containers fabricated from metal. The container housings are further preferably configured to be stacked within one another to facilitate shipping and handling thereof.

19 Claims, 5 Drawing Sheets

U.S. PATENT DOCUMENTS 6,889,513 B1 * 5/2005 Clark .......................... 62/244
6,979,829 B2 * 12/2005 Calvert et al. ............ 250/472.1
7,237,689 B2 * 7/2007 Maggio et al. .............. 220/908
7,482,928 B2 * 1/2009 Brackmann et al. ...... 340/572.1
2008/0116773 A1 * 5/2008 Van Loon et al. ........... 264/241

* cited by examiner

MULTI-COMPONENT CONTAINER SYSTEM AND METHOD FOR MANUFACTURING THE SAME

CROSS-REFERENCE TO RELATED APPLICATIONS

Not Applicable

STATEMENT RE: FEDERALLY SPONSORED RESEARCH/DEVELOPMENT

Not Applicable

BACKGROUND

Waste containers or "dumpsters" are well-known in the art and extensively utilized to facilitate the collection, transfer and disposal of residential, commercial, municipal and industrial waste. Generally, such waste containers are constructed from thick sheets of metal that define a trash receptacle within which refuse is stored. Such metal containers rest upon multiple casters (typically four casters positioned at the respective corners of the receptacle), and are further typically provided with one or more lids hingeingly attached about the upper perimeter of the container which defines the receptacle. In this regard, such lid structures are operative to conceal the contents within the waste container until such time as the refuse is collected therefrom.

To that end, most waste containers fabricated from metal are provided with slots formed on opposed sides of the trash receptacle that are operative to engage with front-loading garbage trucks. In this respect, and as is well-known in the art, such front-loading garbage trucks are provided with large prongs that are aligned to be inserted into dedicated ones of the opposed slots of the trash receptacle. Hydraulics then lift the prongs and hence the trash receptacle, eventually flipping the trash receptacle upside down and emptying its contents into the trucks hopper. Along these lines, most trash receptacles of the aforementioned nature are provided in standardized sizes, and are typically provided with a consistent width (typically 8 feet) to thus enable rapid emptying via the aforementioned front-loading waste collection vehicles or garbage trucks.

Despite their durability, numerous drawbacks are associated with the use of conventional waste containers fabricated from metal. First and perhaps foremost, is the substantial weight of such containers, which makes such waste containers difficult to manipulate and add substantially to the costs associated with their shipment. More specifically, due to the substantial weight of metal-fabricated waste containers, coupled with their size, substantial transportation costs and space inefficiencies arise as a result of having to transport such items. In this regard, shipping conventional waste containers fabricated from metal via truck or train is well-known in the art to be expensive due to fuel costs, as well as consume substantial space insofar as it is impractical, if not impossible, to ship multiple containers in a space-efficient manner.

Further problematic with conventional waste containers fabricated from metal is the inability to clean such receptacles due to their weight. As such, metal containers are prone to rust and corrosion, as well as are susceptible to reaction with everyday chemicals and solvents. Along these lines, metal waste containers must typically be repainted and require routine maintenance to preserve their functionality.

Moreover, by virtue of being fabricated from metal, to the extent a portion of the dumpster becomes damaged or broken, and especially if one or both slots of the trash receptacle become broken or otherwise cannot be aligned with the arms of the front-loading garbage truck, the metal trash receptacle becomes inoperable for its intended purpose.

Still further problematic with prior art waste containers fabricated from metal is their exceptional loudness which can generate substantial noise pollution by virtue of the reverberation of the metal surfaces. Indeed, it is well known that prior art waste containers fabricated from metal produce significant noise via the opening and closing of lids, when trash is deposited within such receptacles, and when such receptacles are emptied by garbage trucks.

Accordingly, there is a substantial need in the art for an improved waste container that avoids the aforementioned deficiencies. In this regard, there is particularly a need in the art for an improved waste container that is substantially less expensive and space efficient to ship; is corrosion resistant or otherwise impervious to virtually all types of chemicals, solvents and the like; is exceptionally durable and can withstand substantial wear and tear, extreme weather conditions and the like; is exceptionally easy to maintain; easy to clean; and produces substantially less noise pollution that prior art waste and trash receptacles fabricated from metal. Still further, there is a need for such an improved waste container that can be formed to have aesthetically pleasing forms, shapes and colors; are fabricated from multi-component construction to thus enable the improved trash receptacles to be easily repaired and have prolonged life; and further can be fabricated from recyclable materials.

BRIEF SUMMARY

The present invention specifically addresses and alleviates the above-identified deficiencies in the art. In this regard, the present invention is directed to an improved modular waste container formed from molded structural foam that can be used in place of conventional waste containers or dumpsters fabricated from metal. The improved waste container includes a receptacle housing that, per conventional waste containers, defines a storage area for receiving and holding refuse. Unlike prior art waste containers fabricated from metal, however, the receptacle housing is formed from molded structural foam and is operative to be stacked within other like receptacle housings to thus enable multiple housings to be stacked and shipped in a substantially more space efficient manner than prior art waste containers. Moreover, by virtue of being formed from molded structural foam, the housings will be substantially lighter, more durable, easier to maintain, and substantially quieter than prior art containers.

Detachably fastenable to the housings include one or more lid members, to thus provide selective opening and access to the interior of the housing, one or more caster wheels, and preferably two slot members fastenable to opposed sides of the housing for use in engaging with the prongs of conventional front-loading garbage trucks to thus enable the improved waste container to be flipped upside down and contents emptying therefrom per conventional metal waste containers.

The components of the improved waste container, and at least the receptacle housing thereof, will be fabricated from a unique structural foam molding process. Such process comprises filling a mold cavity having predetermined dimensions with resin that is injected at a low pressure and slow speed that expands therewithin. The resin may comprise one or more polymers selectively chosen to impart desired properties. As a consequence, the housing possesses very little built-in stress and virtual freedom from environmental stress cracking, which in turn provides greatly improved tolerance to age, environment, rough usage and general wear.

By virtue of being fabricated in molded structural foam, the improved waste containers may be fabricated to have any of a variety of colors and properties and, by virtue of being formed via a molding process, can be designed to have virtually any type of shape or appearance. Likewise, the improved waste container, and particularly the receptacle housing thereof, never requires painting, is easy to clean, rustproof, leakproof, and substantially more sanitary than prior art waste containers fabricated from metal. Still further, by virtue of being fabricated from polymers, which are recyclable in nature, the improved waste containers of the present invention can be fabricated from and are themselves recyclable. Likewise, by virtue of being fabricated via a molding process, the improved waste containers of the present invention can be fabricated to possess any of a variety of standardized or customized sizes, as may be desired.

BRIEF DESCRIPTION OF THE DRAWINGS

These as well as other features of the present invention will become more apparent upon reference to the drawings.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
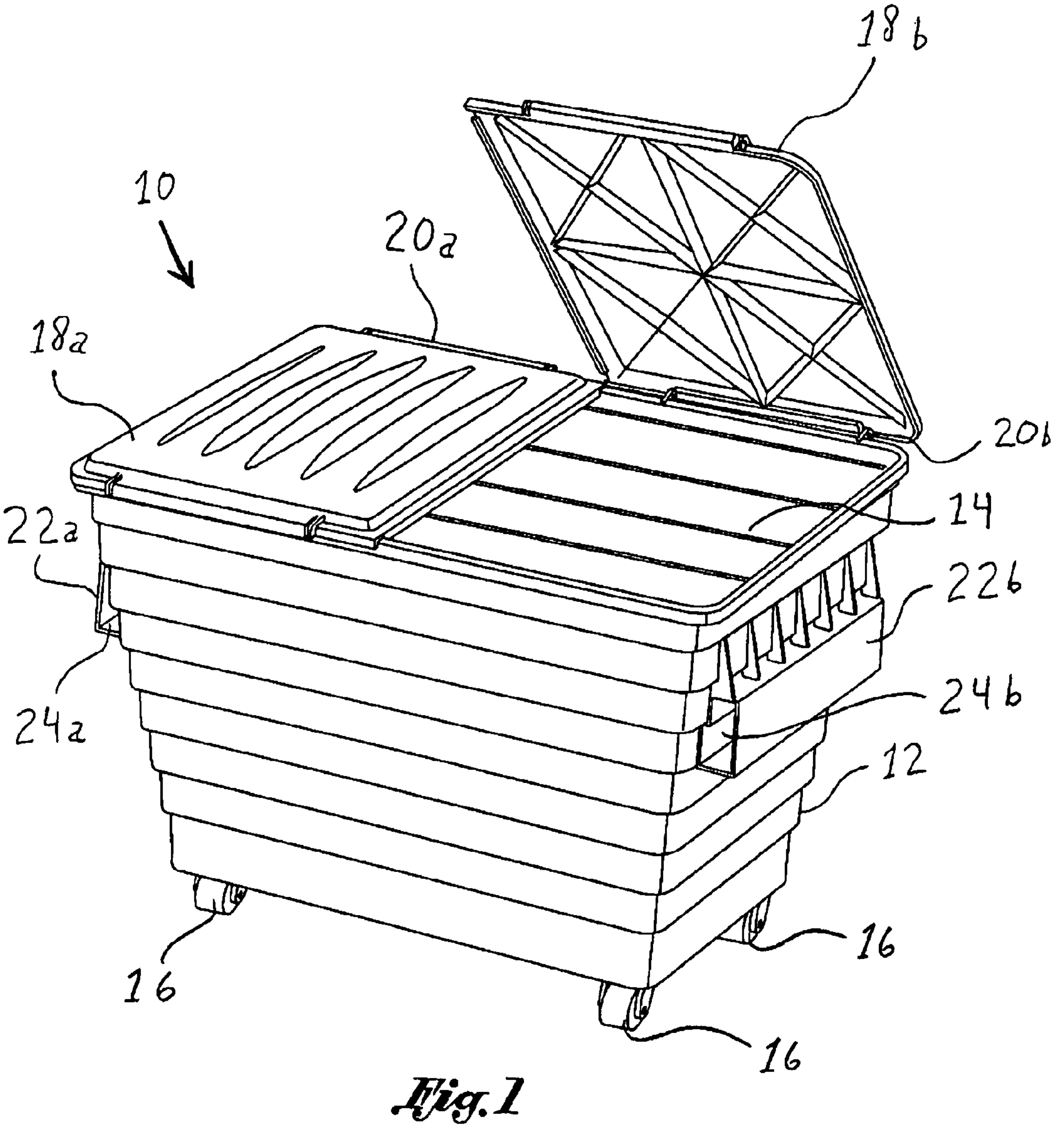
FIG. 1 is a frontal perspective view of an improved waste container constructed in accordance with a preferred embodiment of the present invention.

Referring now to the figures, and initially to FIG. 1, there is perspectively illustrated an improved waste container 10 as constructed in accordance with a preferred embodiment of the present invention. In several respects, the improved waste container 10 is operative to have a configuration similar to conventional waste containers known in the art, and hence would be understood by one of ordinary skill. The improved waste container 10 comprises a receptacle housing 12 that defines an internal cavity 14, the latter defining a temporary refuse holding area. In this regard, the receptacle housing 12 will be sized and configured to provide a sufficient internal volume within holding area 14 to receive and temporarily hold a specific volume of refuse. To that end, and as discussed more fully below, the receptacle housing 12 may be formed to have any of a variety of desired dimensions, including a desired height, width and depth. With respect to the width, it is contemplated that the receptacle housing 12 will possess a standardized width, such as eight feet, to thus enable the improved waste container 10 to be utilized as a substitute for conventional waste containers fabricated from sheet metal and the like.

Along these lines, and as per conventional waste containers, the improved waste container 10 will be provided with one or more casters 16 to enable the improved waste container 10 to be easily rolled to a desired position. To that end, casters 16 may take any of a variety of known configurations, and can be fabricated from a wide variety of materials, namely, metal, plastic and the like. Exemplary of such caster 16 suitable for use with the improved waste container 10 of the present invention include those casters produced by Caster Ranch of San Juan Capistrano, Calif.

The improved waste container 10 will further be provided with at least one cover or lid member, such as first and second lid members 18*a*, 18*b*, as shown. Per conventional waste container construction, it is contemplated that the lid members 18*a*, 18*b*, may be attached via dedicated hinges 20*a*, 20*b*, to thus enable the interior 14 of receptacle housing 12 to be readily accessed, on the one hand, but easily and securely closed, on the other hand. Although not shown, it will be well understood that the lid members 18*a*, 18*b*, may be provided with one or more locking mechanisms to thus enable the same to be maintained in a secure, locked configuration, as may be accomplished via engagement with padlocks, chains and the like.

The improved waste container 10 will further preferably be provided with detachably fastenable arms 22*a*, 22*b* engageable with opposed sides of the receptacle housing 12. Such arms 22*a*, 22*b* will define slots 24*a*, 24*b* operative to receive and engage with the prongs of front-loading garbage trucks. Along these lines, it is contemplated that the width of the receptacle housing 12 will be fabricated such that the arms 22*a*, 22*b* will fit thereupon such that the slots 24*a*, 24*b* will be oriented to engage with the prongs of the front-loading garbage truck to thus enable the improved waste container 10 to be picked up and eventually flipped upside down to thus enable the refuse stored within the interior 14 of the receptacle housing 12 to be emptied into the garbage truck's hopper storage compartment. In this regard, it is contemplated that the improved waste container 10 will be functional in every respect as per conventional waste containers.

Figure 2:
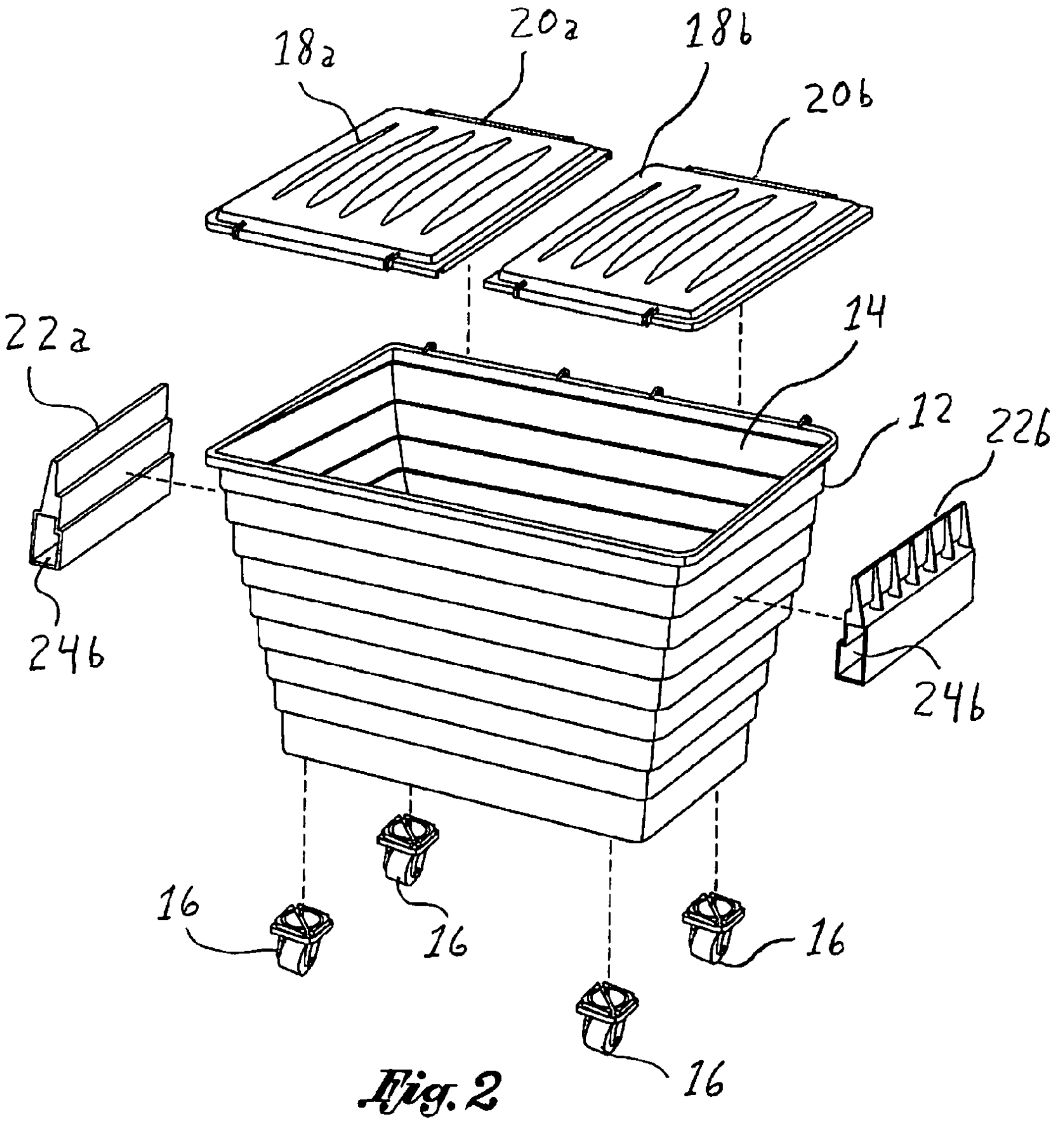
FIG. 2 is an exploded view of the improved waste container depicted in FIG. 1.

As illustrated in FIG. 2, however, the various components of the improved waste container will be modular in nature with each of the respective components being detachably fastenable to the receptacle housing 12. By virtue of such construction, the improved waste container 10 advantageously allows for rapid and easy assembly, in sharp contrast to prior art waste containers fabricated from sheet metal, which typically include slot members that are integrally formed within the receptacle housing body. The improved waste container of the present invention 10 further allows for easy and rapid repair should any one component break, malfunction or otherwise become unusable. As will be readily appreciated by those skilled in the art, prior art, metal fabricated waste containers do not provide any type of modular construction and require extensive effort and metal fabrication to the extent any component thereof fails to function properly.

Figure 3:
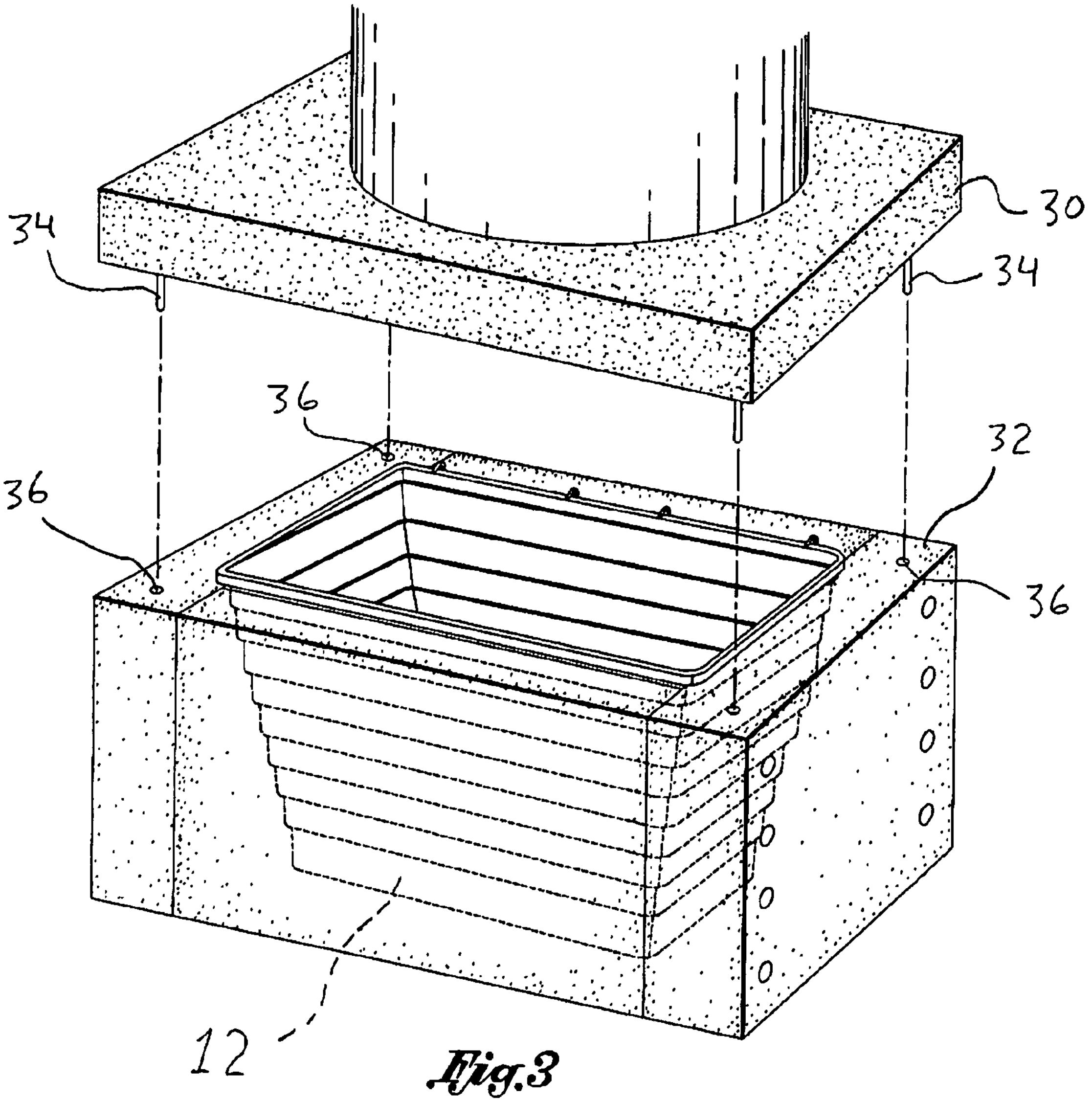
FIG. 3 is a perspective view of a mold cavity within which the trash receptacle housing of the present invention is formed via a structural molding process.

Referring now to FIG. 3, there is shown an exemplary process by which a component of the improved waste container 10, namely, the receptacle housing 12, may be fabricated. An important aspect of the present invention resides in the fabrication of the receptacle housing 12, which is preferably fabricated from molded structural-foam. To practice such molding process, there will be provided a mold cavity, which may comprise the combination of first and second mold components 30, 32 that are operative to engage one another in a precise orientation, to thus define the cavity within which the receptacle housing 12 is formed. To facilitate the interconnection between mold components 30, 32, it is contemplated that a registry mechanism, such as engagement between pins and apertures 34, 36 formed upon dedicated ones of the mold structures 30, 32 may be aligned and interconnected.

Within such mold cavity, a polymer resin is injected at a low pressure and slow speed to thus create a structural foam that fills within the mold cavity. With respect to the polymer resin, it is contemplated that any of a wide variety of polymers may be chosen, as well as combinations thereof, to thus impart desired features to the receptacle housing 12, or any other component of the improved waste container 10 that is manufactured by the structural foam molding process discussed herein. In this regard, by selecting polymers having known characteristics, the improved waste container 10, or at least any component thereof, such as receptacle housing 12, may be formed to have a desired impact resistance, resistance to temperature extremes, and in particular cold temperatures, desired strength/tension properties, resistance to various types of chemicals, as well as desired aesthetic features, such as color, shape and the like. Exemplary of the types of polymers suitable for use in the structural foam molding process of the present invention include commercially available polyolefins such as polypropylene and polyethylene, including high density polyethylene (HDPE) and low density polyethylene (LDPE). Such polymers may preferably possess the characteristic of having a melt flow index within the range of ML 30-70. By virtue of utilizing such polymers, it is contemplated that one or more of the components of the improved waste container 10 can be fabricated from recycled materials, as will be readily understood by those skilled in the art. Indeed, any component of the improved waste container 10 fabricated from the structural foam molding process will itself be recyclable to thus enable those components to not only be formed from recycled materials, but be recyclable themselves. Still further, by virtue of being fabricated from a specific type of polymer material those components, including receptacle housing 12, will never require painting and any color will be inherent through the polymer material.

With respect to the parameters under which the structural foam molding processed is achieved, it is contemplated that the polymer resin will be injected into the mold cavity at a pressure of around 3000 to 1800 PSI at a rate of 30 kilograms per second. In a most highly preferred process, the polymer will be injected at a pressure of approximately 2000 PSI at a speed from 30 kilograms per second to 50 kilograms per second. By forming the structures from structural foam according to the aforementioned process results in very little built-in stress and virtual freedom from environmental stress, cracking, and not to mention greatly improved tolerance to age, environmental factors, rough usage and general wear.

By virtue of using the structural foam molding process, various components of the improved waste container 10 can be formed that are larger and sturdier than like components fabricated from wood, metal, concrete and fiberglass. Moreover, the various parts formed form the structural foam molding process are substantially more sound structurally, nearly stress-free, can be formed to be thicker, sturdier and possess substantially minimal warpage compared to prior art materials. In this regard, it is contemplated that the structural foam molding process of the present invention may actually be utilized to form a variety of housing structures, which can range from shipping containers, framework/housing structures for appliances, building materials, vehicle frames, or any of a variety of structures that will be readily appreciated by those skilled in the art where it is desired to utilize structural components, housings and frameworks that are substantially more durable, stronger and can possess substantially greater resistance properties, whether it be weather, temperature, chemical exposure and the like, compared to prior art materials, and in particular structures and the like fabricated from metal.

Also, by virtue of being fabricated via a molding process, any or all components of the improved waste container 10, and in particular the receptacle housing 12 thereof, may be formed to have any desired shape and/or configuration. Moreover, by virtue of being fabricated from a polymer material, the receptacle housing 12, or any other component so fabricated to be utilized therewith, will possess highly desired sound dampening properties which in turn will produce substantially less noise as can be generated by the manipulation and handling of waste containers fabricated from metal. In this regard, it is well-known to those skilled in the art that the use of waste containers fabricated from metal generate substantial noise pollution during their use.

Figure 4:
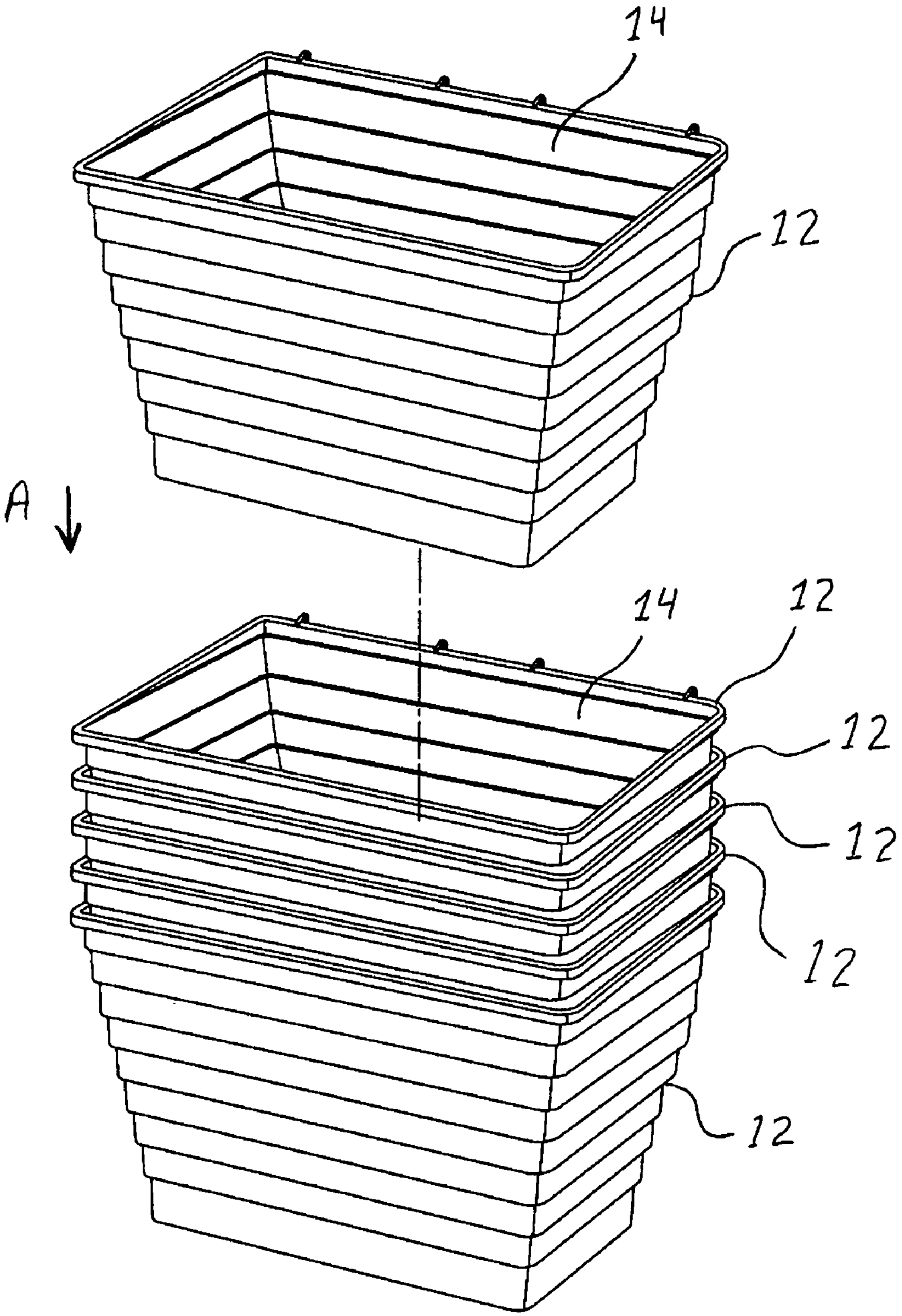
FIG. 4 is a perspective view of multiple receptacle housings shown stacked within one another to facilitate handling and storage of the improved waste containers of the present invention.

Among the further advantages that can be readily appreciated by those skilled in the art is depicted in FIG. 4, wherein multiple ones of the receptacle housing 12 can be stacked within one another as shown. As is unattainable via metal waste containers fabricated from metal, the receptacle housing 12 can be stacked within other like receptacle housings 12 to thus maximize the number of receptacle housing units that can be stored or shipped at any given time. Metal waste containers, in contrast, cannot be stacked within one another due to weight constraints and further due to the integration of the slots formed on the opposed sides of such waste containers that restrict the ability of the dumpsters to be stacked within one another. As will be readily appreciated by those skilled in the art, by virtue of being able to stack like receptacle housings 12, substantial reductions in transportation costs and space efficiency are attained. This feature is further greatly enhanced due to the light weight nature of the receptacle housing 12 that arises simply by virtue of forming the housing 12 from polymer materials. Indeed, by virtue of being fabricated via the structural foam molding process, coupled with the modular nature of the components utilized to assemble the improved waste container of the present invention, the improved waste containers of the present invention have substantially lower maintenance costs, as compared to conventional waste containers fabricated from sheet metal and the like.

Figure 5:
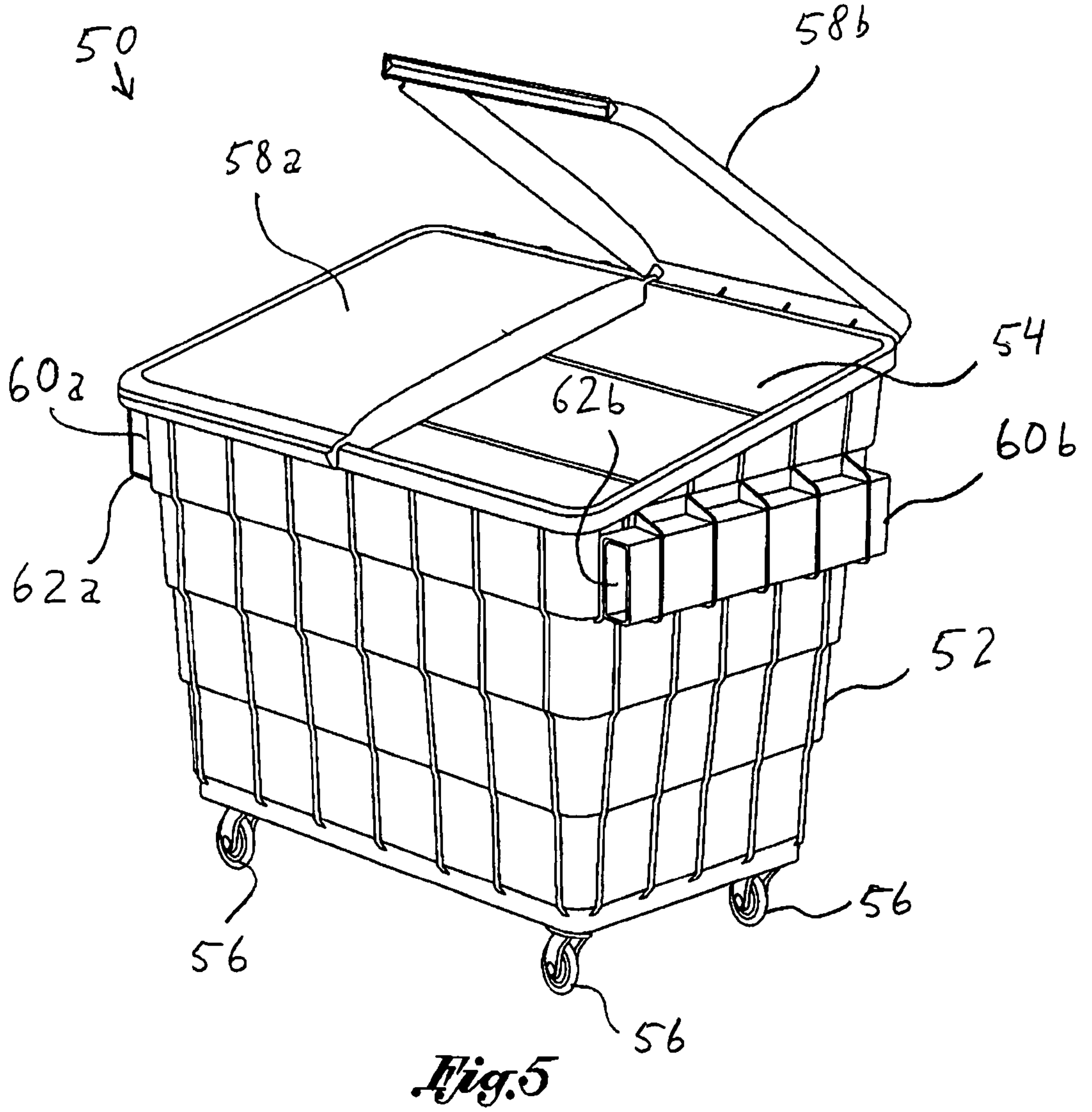
FIG. 5 is a perspective view of the improved waste container of the present invention possessing an alternative external configuration.

Referring now to FIG. 5, there is shown an alternative embodiment 50 of the improved waste container of the present invention. As discussed above, by virtue of being fabricated from a structural foam molding process, any or all components so fabricated may have any desired configuration. In the embodiment shown, receptacle housing 52 has a tiered, ribbed structure but, as per the embodiment depicted in FIGS. 1-2, and most conventional waste containers, such receptacle housing 52 is operative to define an internal void 54 operative to receive and temporarily hold refuse, as well as is operative to receive and engage with lid structures 58*a*, 58*b*. The embodiment shown is further provided with arm members 60*a*, 60*b* the latter defining slot 62*a*, 62*b* that are operative to engage with the prongs of a front-loading garbage truck, as discussed above. Such embodiment 50 may further be provided with one or more casters 56, to facilitate transportation and placement of the improved waste container, as will be easily understood by those skilled in the art.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention. Along these lines, it is contemplated that the structural molding process discussed herein may find widespread application for fabrication of any of a variety of container structures, including but not limited to shipping containers, air cargo containers, or any other housing, frame or structural component.

What is claimed is:

1. An improved waste container comprising:

a receptacle housing consisting of molded structural foam, said receptacle housing defining an internally tiered area for receiving and temporarily storing refuse, said receptacle housing further defining an externally tiered configuration;

at least one caster;

at least one lid member;

a pair of arms defining slots extending therethrough, the pair of arms consisting of molded structural foam; and wherein said at least one caster, at least one lid member, and said pair of arms are detachably fastenable to said receptacle housing, said pair of arms being fastenable to said receptacle housing so as to engage respective ones of a pair of prongs from a front-loading garbage truck.

2. The improved waste container of claim 1 wherein said receptacle housing is formed to be stacked within another like receptacle housing.

3. The improved waste container of claim 2 wherein multiple receptacle housings can be stacked within one another.

4. The improved waste container of claim 1 wherein said structural foam comprises at least one polymer.

5. The improved waste container of claim 4 wherein said polymer is a recycled polymer.

6. The improved waste container of claim 4 wherein said polymer is resistant to corrosion.

7. The improved waste container of claim 4 wherein said polymer has a desired color.

8. The improved waste container of claim 1 wherein said structural foam is molded via a process consisting of injecting a polymer at low pressure and low speed within a mold.

9. The improved waste container of claim 8 wherein said polymer is injected at a pressure ranging from 3000 PSI to 1800 PSI.

10. The improved waste container of claim 8 wherein said polymer is injected at a speed ranging from 30 kilograms per second to 50 kilograms per second.

11. The improved waste container of claim 1, wherein each arm defines a tiered portion complimentary to the receptacle housing.

12. An improved waste container comprising:

a receptacle housing consisting of molded structural foam, said receptacle housing defining an area for receiving and temporarily storing refuse, said receptacle further defining an externally tiered configuration;

at least one caster;

at least one lid member;

a pair of arms defining slots extending therethrough; and wherein said at least one caster, at least one lid member, and said pair of arms are detachably fastenable to said receptacle housing, said pair of arms being fastenable to said receptacle housing so as to engage respective ones of a pair of prongs from a front-loading garbage truck.

13. The improved waste container of claim 12 wherein said receptacle housing is formed to be stacked within another like receptacle housing.

14. The improved waste container of claim 13 wherein multiple receptacle housings can be stacked within one another.

15. The improved waste container of claim 12 wherein said structural foam comprises at least one polymer.

16. The improved waste container of claim 12 wherein said structural foam is molded via a process consisting of injecting a polymer at low pressure and low speed within a mold.

17. The improved waste container of claim 16 wherein said polymer is injected at a pressure ranging from 3000 PSI to 1800 PSI.

18. The improved waste container of claim 16 wherein said polymer is injected at a speed ranging from 30 kilograms per second to 50 kilograms per second.

19. The improved waste container of claim 12, wherein each arm defines a tiered portion complimentary to the receptacle housing.

* * * * *